Figure 1:
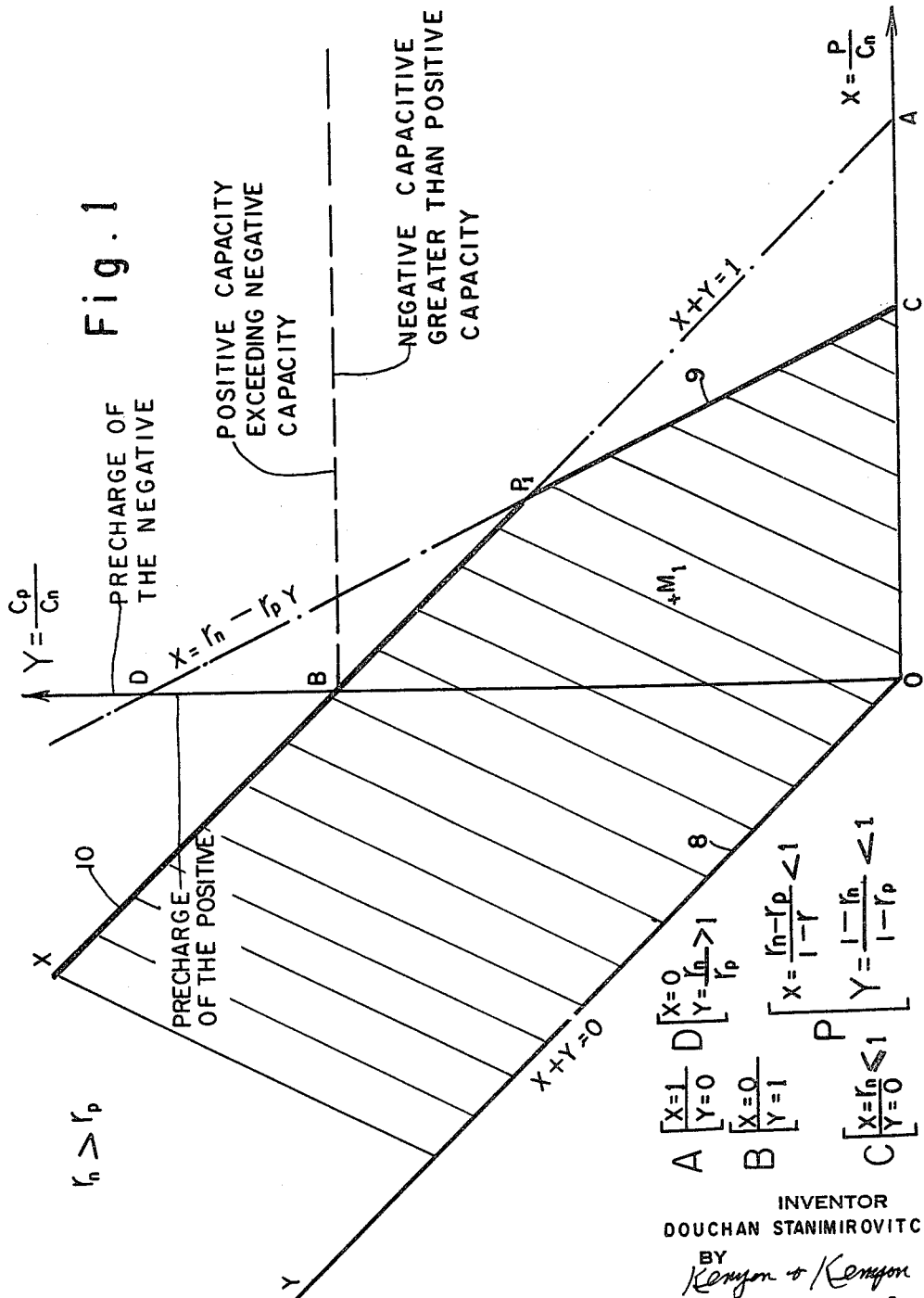

March 23, 1965     D. STANIMIROVITCH     3,174,879
SEALED ELECTRIC ACCUMULATOR
Filed Nov. 19, 1962     6 Sheets-Sheet 4
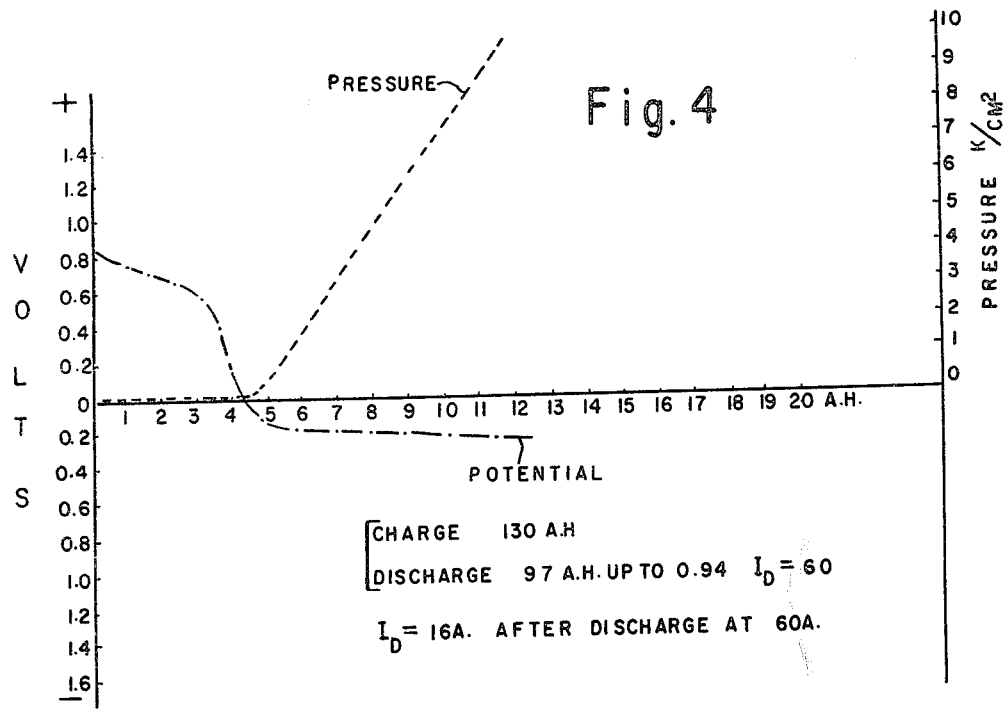
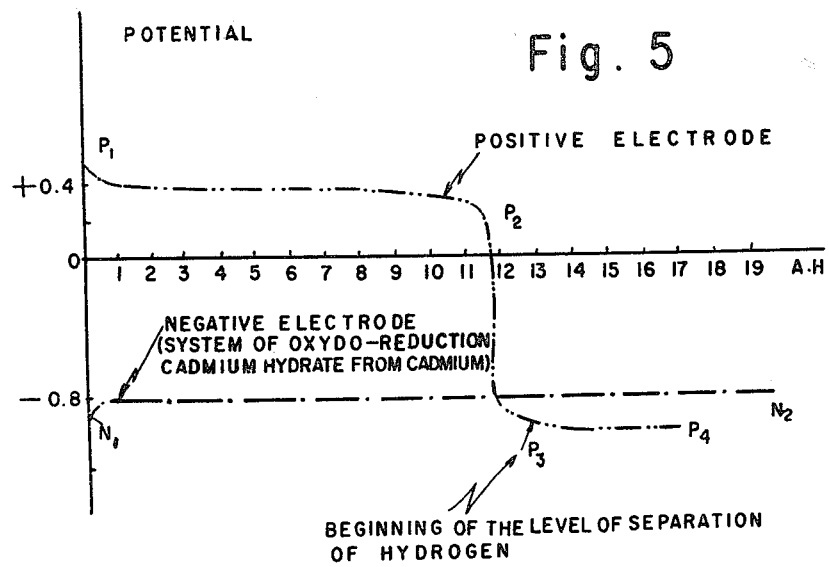
INVENTOR
DOUCHAN STANIMIROVITCH
BY
Kenyon & Kenyon
ATTORNEYS

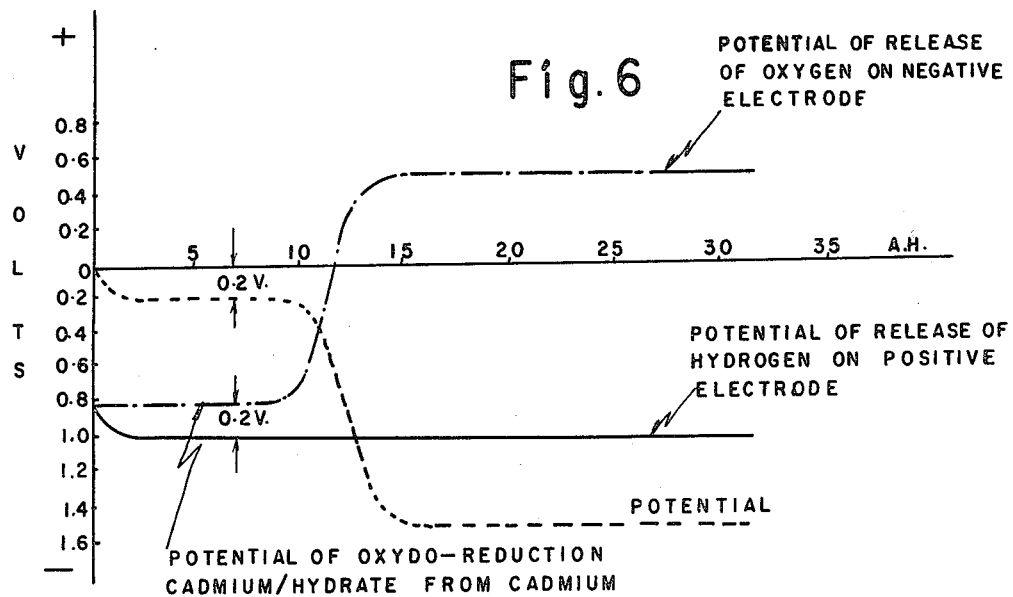
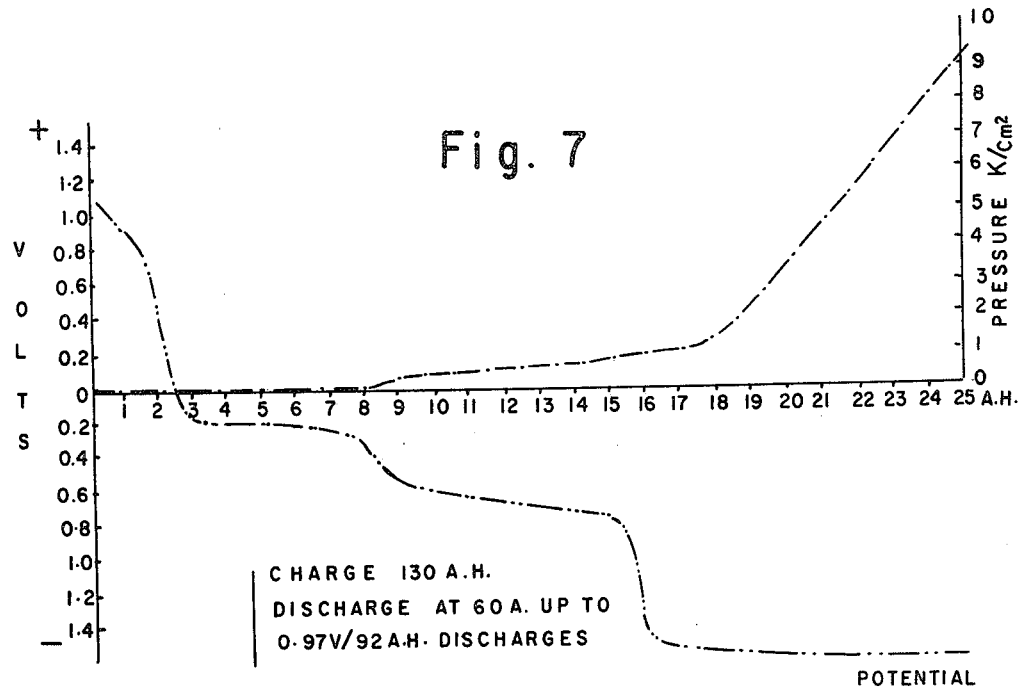

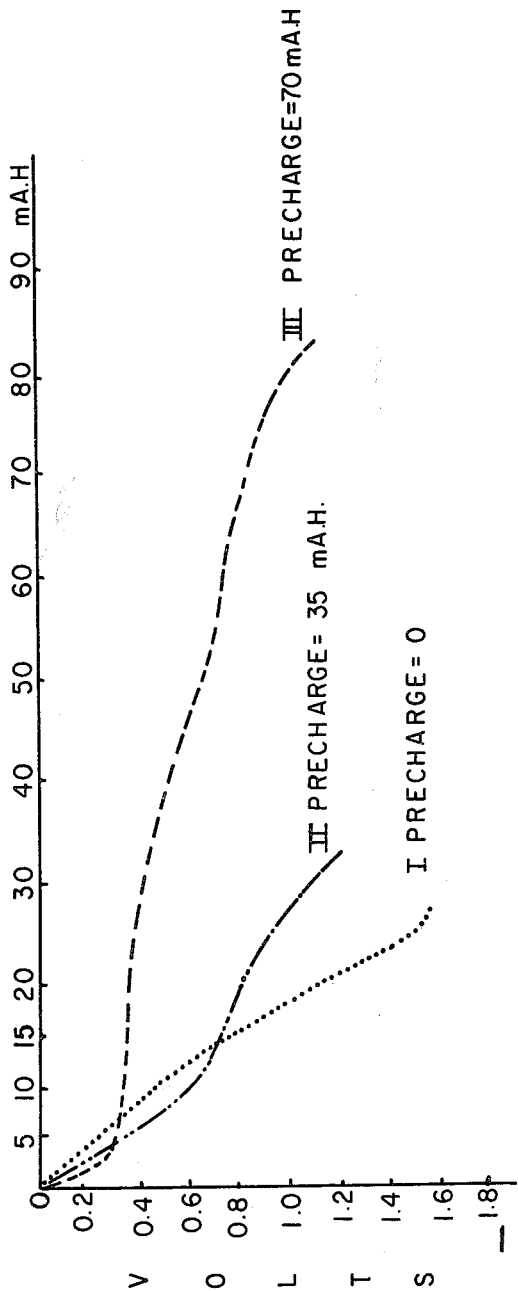

United States Patent Office 3,174,879
Patented Mar. 23, 1965

3,174,879
SEALED ELECTRIC ACCUMULATOR
Douchan Stanimirovitch, Paris, France, assignor to Societe des Accumulateurs Fixes et de Traction (Societe Anonyme), Romainville, Seine, France, a company of France
Filed Nov. 19, 1962, Ser. No. 238,535
Claims priority, application France, Dec. 7, 1961, 881,315
2 Claims. (Cl. 136—6)

This invention relates to a construction process for sealed electric accumulators and electrolytic cells, more particularly, though not exclusively, to those containing an alkaline electrolyte, and to cells resulting from said process.

It is known that the main problem in the manufacture of sealed accumulators is to achieve a means for controlling the gaseous evolvement inside the accumulator, once it has been closed. It is important to be concerned, above all, with the hydrogen, removal of which is very difficult.

To achieve this purpose, various solutions have been advanced among which should be mentioned the solution consisting in endowing the negative electrode with a capacity exceeding that of the positive and in having the two electrodes in the discharged state upon accumulator closure.

It has also been proposed to precharge the negative electrode so that the precharge value will be below, or at best equal to, the capacity difference of the two electrodes.

However, it has been noted that the proposed solutions, when strictly applied, do not infallibly permit achievement of the intended objectives.

The present invention essentially intends not only to remedy this state of affairs, but also to provide a very general solution. Its objective is a construction process of electric accumulators characterized in particular by a selection of the amount P of the precharge and the overall capacities $C_1$ and $C_2$ of the two electrodes so that the values of P, $C_1$ and $C_2$ will be within the space defined by the straight lines corresponding to the following equations and for positive values of $y$:

(1) $\quad x+y=0$
(2) $\quad x+y=1$
(3) $\quad x=r_1-r_2y$ where $$x=\frac{P}{C_1}, \quad y=\frac{C_2}{C_1}$$

whereas $r_1$ and $r_2$ are the coefficients having a value below unity defining the state of charge $rC$ of an electrode the moment the charge efficiency begins to drop below 100%.

According to another characteristic of the invention, to take the fact into account that the oxygen liberated on the positive electrode will depolarize the negative electrode, the above inequality (2) is influenced by a coefficient K that is greater than unity, resulting in:

(2') $\quad K(C_1-P) \geqslant C_2$

According to one mode of construction, the negative electrode is given an overall capacity exceeding that of the positive electrode, the precharge being applied as required on the negative or positive electrode.

According to a variant, the positive electrode is provided with an overall capacity exceeding that of the negative electrode, and the precharge is applied on the positive electrode.

Thus, it could also be noted, as proven below, that by applying the very general rules set forth above it is possible, within very wide ranges and without being overly concerned with the relative capacities of the two electrodes facing one another, to define accumulator operating conditions that would not result in the formation of hydrogen.

One case, relating to the so-called reversal phenomenon, deserves the utmost attention. Indeed, when the battery discharge current continues to pass through one of the accumulators of a battery, said accumulator being discharged, a reversal of its polarity accompanied by a gaseous evolvement, which is an immediate consequence thereof, will occur. To eliminate the drawbacks of such a reversal, various solutions have been advanced, such as, for instance, the adding of so-called "anti-polar" masses to the active electrode materials. It is known that these "anti-polar" masses are formed by the active material opposite to the polarity of the active material of the electrode. The function of these "anti-polar" masses is to permit the current to flow through the discharged cell without forming gases for a limited time of reversal.

It is also an object of this invention to remedy these drawbacks by using the above-mentioned teachings and without relying on anti-polar masses or expedients of this type. According to the main characteristic of this invention and in order to restrict or delay the gaseous evolvement upon the occurrence of the reversal phenomenon, an auxiliary or intermediary reversal level in voltage of the cell is created, which is situated between that of the reversal onset in the neighborhood of $-0.2$ v. and that corresponding to $-1.5$ v., preferably around $-0.6$ to $-0.8$ v.

According to another characteristic of the invention, the negative electrode is provided with an excess capacity.

According to another characteristic of the invention, the positive electrode is given a precharge prior to accumulator closure.

According to yet another characteristic of the invention, the value of the above-mentioned precharge may vary between 5 and 30% of total capacity.

Indeed, a case in which the negative electrode would have a capacity exceeding that of the positive electrode and in which, simultaneously, the positive electrode would be precharged would a priori appear to be devoid of any interest. The reason for this is that the accumulator capacity, which is limited by the capacity of the positive electrode, would, in the present case no longer be limited by the latter, but by the difference between the capacity of the positive electrode and the precharge, i.e. that it will be lesser. However, as indicated below, it is particularly this circumstance that offers an important advantage in the case of the present invention.

Owing to the process according to the invention it is thus possible to set up an accumulator, e.g. a nickel-cadmium alkaline accumulator, that can be closed not only upon charge completion and during overcharge, but also during reversal, provided, of course, one does not go beyond extreme discharge current densities. During this reversal, only oxygen is formed which is made to take part in a cycle of secondary reactions probably occurring in the compartment of the positive electrode which acts in this instance as a cathode compartment.

Accordingly, during an appreciable period of the reversal, no free gas, or else an insignificant amount of free gas, is formed.

The process according to the invention applies more particularly, though not exclusively to accumulators characterized by the following means:

They are provided with thin sintered electrodes less than 1 mm. in thickness, said electrodes having a powdered sintered nickel support.

The positive electrode contains nickel hydroxide to which cobalt hydroxide may have been added, whereas the negative electrode contains cadmium hydroxide.

The negative electrode is provided, as known, with a capacity exceeding that of the positive electrode, for example, from 10 to 40%;

The spacing between the electrodes is in the order of 0.2 mm., preferably even below this value.

The separator between the two electrodes is composed by one or more plies of a porous material, the pores of which are capillary and it covers completely the surfaces of the electrodes.

The electrolyte required for operation is that absorbed by capillarity in the block made up of electrodes and the separator.

The application of the process according to the invention to accumulators of this type is materialized by giving a suitable precharge to the positive electrode.

It goes without saying that the invention is in no way limited to these particular accumulators which were mentioned solely by way of example.

As new industrial products, the invention also relates to accumulators and electrolytic cells designed by the application of the aforementioned process.

Figure 2:
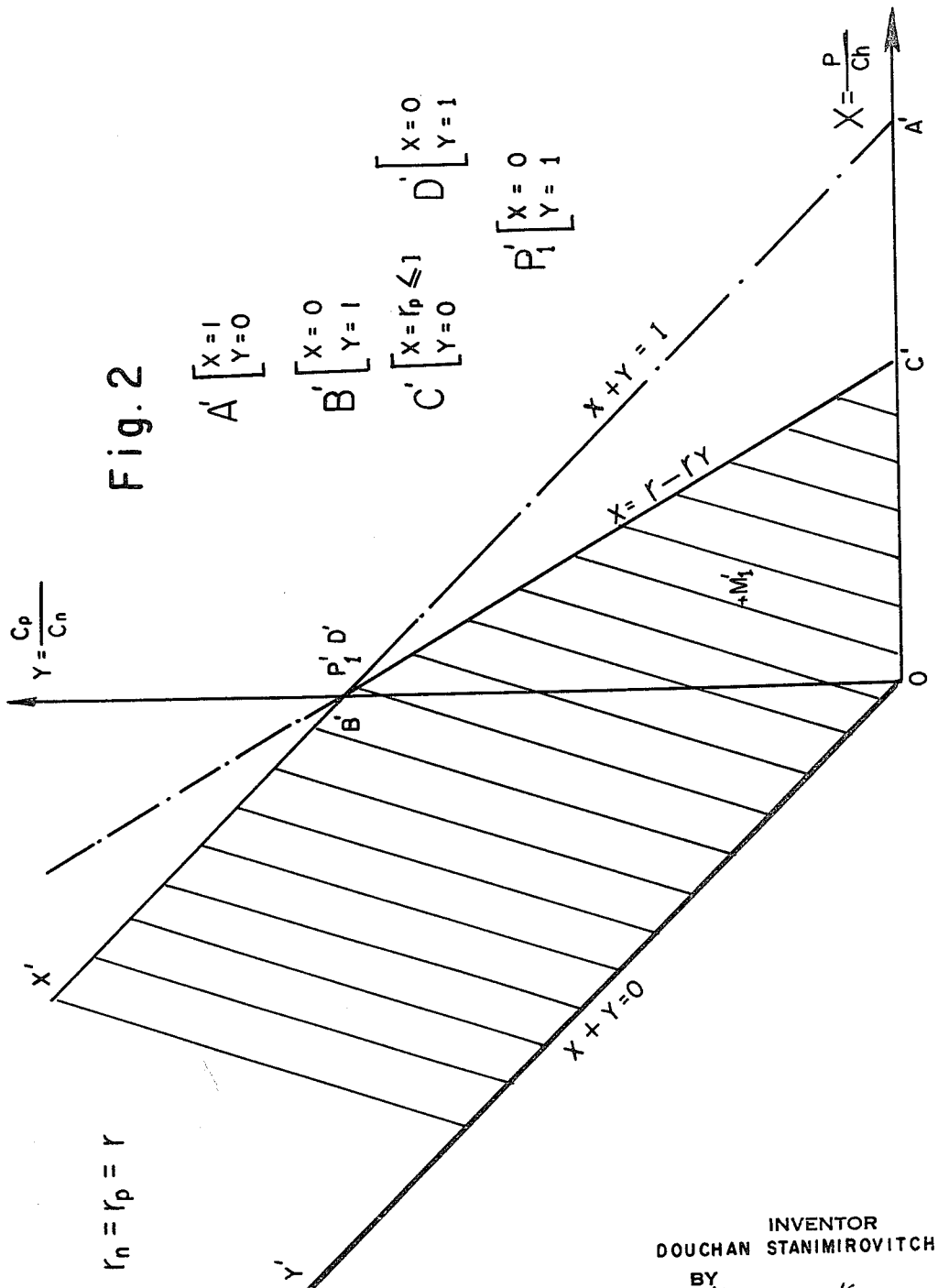
Figure 3:
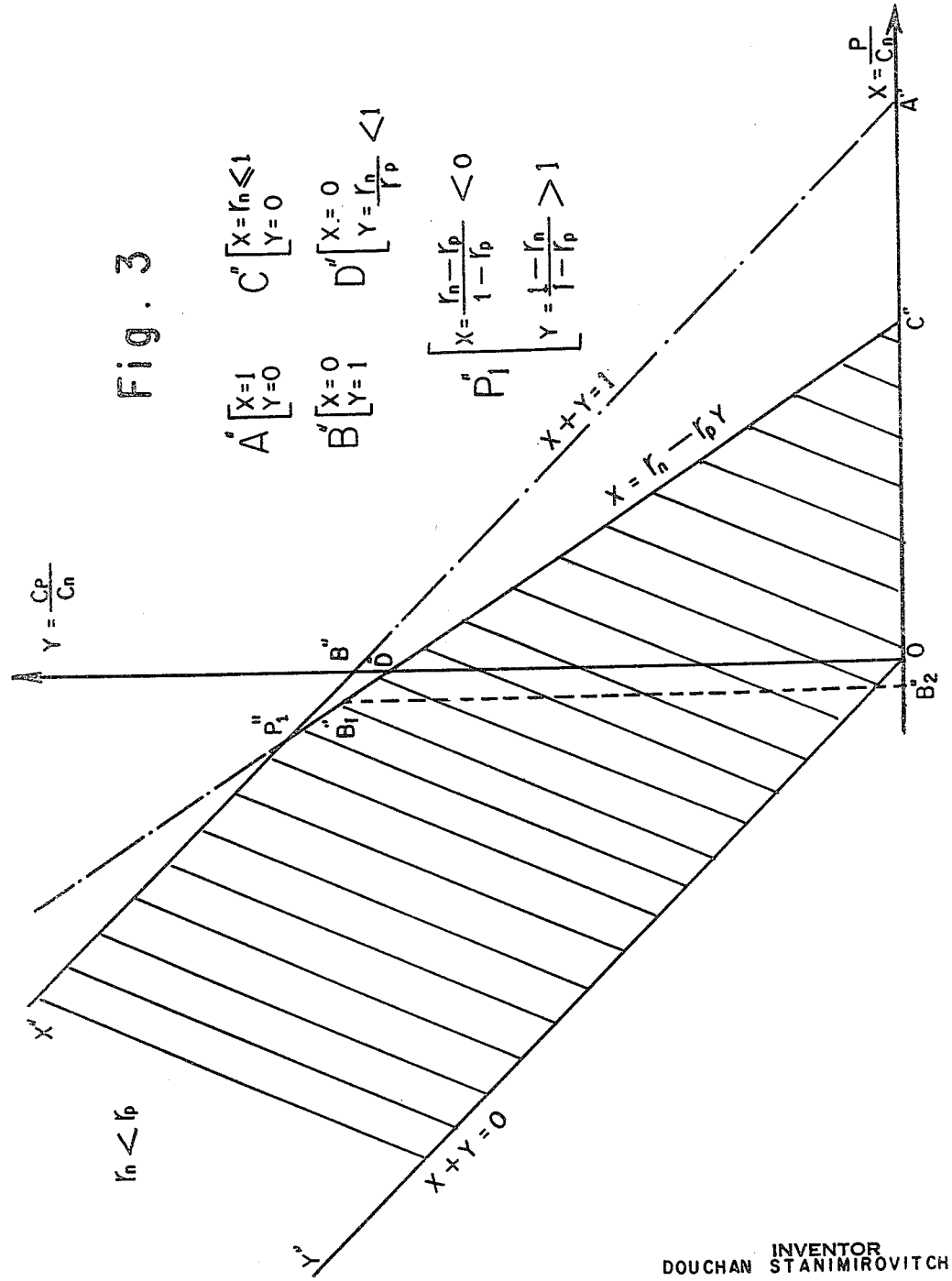

In the annexed drawings, given solely by way of example:

FIGS. 1, 2 and 3 represent graphs plotted according to the invention and relating to three different general cases likely to arise in practice;

FIGS. 4 to 7 relate to examples of polarity reversal, and

FIG. 8 relates to the case of another example.

The following terms and parameters will be used below:

$C_1$ and $C_2$ designating the respective total capacities of the two electrodes, $C_p$ the total capacity of the positive electrode, and $C_n$, the total capacity of the negative electrode, achieved, for instance, under normal discharge conditions, P representing the precharge value of one of the electrodes, and $r_1$ and $r_2$ representing the coefficients less than unity characterized by the fact that, when the charge efficiency of the respective electrodes ceases to be equal to 100%, the amounts of electricity charged on these electrodes are $r_1 C_1$ and $r_2 C_2$, respectively.

The reasoning and the conclusions that follow relate, first and foremost, to the case of a negative electrode having a capacity exceeding that of the positive. It is obvious that the same reasoning, as will be pointed out in passing, is directly applicable to the opposite case, that is, to a positive electrode having a capacity greater than that of the negative.

The precharge P given to one of the electrodes, the positive or negative, on closing of the accumulator will be considered positive should the negative have received this precharge, and negative if it was the positive that was precharged by this amount. As this precharge P cannot exceed the capacity of the electrode to which it was applied prior to accumulator closing, we obtain:

(4) $\qquad -C_p \leqslant P \leqslant C_n$

We shall restrict ourselves to the case aiming at avoiding the formation of hydrogen during charge and overcharge of a sealed accumulator.

Two conditions, simultaneously present, are required to this end:

(a) Oxygen must appear first, that is, prior to the formation of hydrogen. This is represented by:

(5) $\qquad r_n C_n - P \geqslant r_p C_p$ (b) The positive must be fully charged before the negative achieves this state, which is equivalent to:

(6) $\qquad C_n - P \geqslant C_p$

It should be pointed out that the second condition does not take the fact into account that the oxygen, from the start of its formation on, certainly exerted a depolarizing effect on the negative, that is, it discharged it by an amount equivalent to this depolarization. Thus, very strictly speaking, this relationship should be expressed as follows:

(7) $\qquad K(C_n - P) \geqslant C_p$ where $K > 1$

The coefficient K depends on the arrangements provided in the accumulator for transmitting the oxygen that is being formed to the cathode compartment.

The fact is thereby taken into account that, in the course of charging the accumulator, from the start of the oxygen formation, the negative may undergo a partial discharge through the effect of this oxygen.

We may point out that, if the condition (6) is given, condition (7) a fortiori.

There are three principal parameters, $C_n$, $C_p$ and P, that can be influenced at the time of accumulator closure. To reduce them to two parameters so as to reason on one plane and to obtain at the same time coefficients without dimensions, two auxiliary variables are defined:

$$x = \frac{P}{C_n}$$

$$y = \frac{C_p}{C_n}$$

Thus, the relationships (4), (5) and (6) become:

(4') $\qquad -y \leqslant x \leqslant 1$ (5') $\qquad r_n - x \geqslant r_p y$ (6') $\qquad 1 - x \geqslant y$ It can thus immediately be seen that if the inequality (6') exists ($x \leqslant 1 - y$), the inequality $x \leqslant 1$ (a part of the inequality 4') is present a fortiori.

The limiting conditions of the inequalities (4'), (5') and (6') become the equations:

(8) $\qquad x + y = 0$ (9) $\qquad r_n - x = r_p y$

(10) $\qquad x + y = 1$

These are straight lines in the $x$ and $y$ plane. The area of the plane corresponding to the inequalities (4'), (5') and (6') are those containing the point of origin of the straight lines 9 and 10, and of the part of the plane situated above the straight line 8. [See FIG. 1.] It goes without saying that only positive values of $y$ must be taken into consideration.

It should be pointed out right away that the two straight lines 8 and 10 are stationary and parallel whereas the straight line 9 is a variable dependent on the values $r_n$ and $r_p$. We thus have a space defined by these three straight lines and have to view it from its interior to draw the constructive and practical conclusions according to the invention.

It is obvious that the only variable element depends on the values $r_n$ and $r_p$. One may consider the following three essential cases:

(A) $r_n > r_p$ (B) $r_n = r_p$ (C) $r_n < r_p$ (Case A) $r_n > r_p$

Plotted on the diagram of FIG. 1 are the three straight lines 8, 9 and 10 defining a cross-hatched space (included in the plane area $XP_1 COY$).

A study of this diagram indicates the following:

(a) All the solutions of the area section $OBP_1C$ are such (point $M_1$) for instance where $$y = \frac{C_p}{C_n} \leq 1$$

(negative capacity $\geq$ positive capacity), and $$x = \frac{P}{C_n} \geq 0$$

where $P \geq 0$ (the precharge is applied on the negative) without letting this precharge exceed the charge at which hydrogen will begin to form on the negative electrode (ultimate limit: point C of the abscissa $$y = \frac{P}{C_n} = r_n$$

where $P = r_n C_n$).

(b) Particular solutions of the straight line OC. In the case of this straight line $$y = \frac{C_p}{C_n} = 0$$

that is, the capacity of the positive electrode is zero. In this case, the negative may be precharged with a charge below, or equal to, that at which hydrogen begins to form on the negative (point C).

(c) Particular solutions of the straight line OB. In the case of these solutions, no precharge is applied, that is to say, the two electrodes are taken in the discharged state. In this case, it is necessary that $$y = \frac{C_p}{C_n} \leq 1$$

B being the limiting point. In particular, all the points at which the negative capacity is greater than that of the positive are suitable (points lying between O and B).

(d) All the solutions of the plane area YOBX are characterized by $$x = \frac{P}{C_n} < 0$$

that is to say, the positive must be given a precharge. In particular, all the points situated above the level of the point B (thus for $$y = \frac{C_p}{C_n} > 1$$

that is, $C_p > C_n$) produce solutions characterized by a positive capacity greater than that of the negative. In the latter case, the positive must thus necessarily be given a precharge. More particularly, assuming that the positive capacity is twice that of the negative, that is to say, $C_p = 2C_n$, the corresponding points are on the portion of the straight line $y = 2$ lying between the straight lines OY and BX. "$x$" would thus have to be between $$x_1 = 1 - y = 1 - 2 = -1 \text{ and } x_2 = -y = -2$$

$x$ being equal to $$\frac{P}{C_n} = \frac{P}{\frac{1}{2}C_p} = \frac{2P}{C_p}$$

which results in having P lying between $-C_p$ and $$\frac{-C_p}{2}$$

Accordingly, the positive must be given a precharge lying between its capacity and one-half thereof.

(Case B) $r_n = r_p$

One has only to refer to the diagram of FIG. 2 which is derived from the diagram of FIG. 1 by the shifting of the point $P_1$ to B and of $D_1$ to B, these three points being thus merged. The section of the plane indicating the solutions of the problem is shaded (section Y'OC'B'X').

The conclusions (a, b, c and d) apply in full.

(Case C) $r_n < r_p$

The conditions shown in the diagram of FIG. 3 are applicable. In this case, the point D" of the ordinate $$\frac{r_n}{r_p}$$

is below the point B" which corresponds to $Y = 1$. It can be proven that the point $P''_1$ of the intersection of the two straight lines $x + y = 1$ and $x = r_n - r_p y$ is necessarily to the left and above the point B". Indeed, the ordinate of this point is $$y = \frac{1 - r_n}{1 - r_p}$$

Since, by assumption, $r_n < r_p$, it follows that $$\frac{1 - r_n}{1 - r_p} > 1$$

All the above conclusions of Case A apply in full except for paragraphs Ac and Ad.

As far as paragraph Ac is concerned, the reasoning should apply to the portion to the right of the straight line OD" instead of OB. In other words, upon using electrodes that are completely discharged at the time the accumulator is being closed, it is necessary that $$y = \frac{C_p}{C_n} \leq \frac{r_n}{r_p}$$

whose limiting condition (point D") is expressed by $r_p C_p = r_n C_n$. By necessity, it is no longer sufficient that the negative capacity exceed the positive. It is necessary, furthermore, that the onset of formation of oxygen on the positive occur prior to the onset of the formation of hydrgen on the negative.

Paragraph Ad can be retained, subject to a slight change, namely, that, in the zone of the trapeze $OD''B''_1B''_2$, the positive must be given a precharge although the capacity of the negative exceeds that of the positive.

It may be pointed out in passing that it is customary with alkaline accumulators to limit the capacity of the accumulator by the capacity of the positive electrode, that is to say, by using a negative electrode having a capacity exceeding that of the positive. The effect of this provision is principally protection against negative electrode capacity loss occurring in the course of its life as a result of the coalescence of the cadmium crystals. The result is a reduction of its active surface.

However, it was pointed out above that it was possible to avoid the formation of hydrogen during the charge of the accumulator by using a positive electrode having a capacity greater than that of the negative, provided the positive electrode is given a certain precharge. This solution may offer a certain advantage in cases where hydrogen formation is furthermore to be avoided during a reasonable period of reversal.

Indeed, this positive electrode contains, owing to its precharge, an excess capacity in the charged state and this excess is being reduced by the hydrogen ions during reversal.

A few examples as well as the results of experiments relating to the case of polarity reversal are described below.

*Example 1*

An accumulator having a rated capacity of 80 ampere hours was used. It was made up of 27 positive and 28 negative plates, both having a sintered support and an active area of 70 x 105 mm. per plate. The thickness of the positive plates was 0.85 mm. and that of the negative plates 0.80 mm. The capacity of the negative electrode represented about 130% that of the positive.

The separator consisted of two layers, one being a serge nylon fabric, and thus very tightly woven, and the other one a cellulose fiber unwoven fabric. The thickness of this separator was approximately 0.2 mm. This thickness was achieved as the result of compacting of the electrode-separator block prior to insertion of the block into the accumulator.

The accumulator had been subjected to a certain number of charging and discharging cycles in the open state and under an excess amount of electrolyte. The excess amount of electrolyte had subsequently been removed.

This accumulator had been charged 130 ampere hours, first by a 37 ampere and then by a 4 ampere current. It was subsequently discharged at 60 ampere by obtaining 97 ampere hours up to a tension of 0.9 v. The accumulator had been provided with a manometer capable of recording a pressure of 10 kg./sq. cm. The discharge was continued at a 16 ampere current and entered a state of reversal.

The resultant curves are indicated in FIG. 4. The ampere hours are shown along the abscissas while the ordinates indicate, on the one hand, the positive as well as negative voltages and, on the other, the pressures in kg./sq. cm.

A study of these curves indicates that the pressures begins to rise as soon as pole reversal has begun and continues a linear ascent as a function of the discharged ampere hours. The tension preserved following reversal onset amounts to about −0.2 v.

By virtue of the value of this voltage, an evolvement of gases can occur on only one of the two electrodes. Thus, only one gas is being formed, i.e. either hydrogen or oxygen.

It can be noted that after 7 ampere hours of reversal (e.g. at 11.5 ampere hours), the overpressure of 10 kg./sq. cm. has been reached.

If the accumulator thus discharged is allowed to rest, it can be noted that this pressure will not go down. One may thus be allowed to infer that it is being caused by hydrogen.

An attempt to furnish an explanation of the phenomena will be made below. It is understood that this explanation in no way limits the scope of the present invention.

The positive electrode is the one that determines the capacity of the accumulator. As soon as it has been completely discharged, it becomes the source of hydrogen evolvement. Since the negative electrode that has a greater charged capacity is not yet fully discharged and thus retains its initial oxidation-reduction level of cadmium, cadmium hydroxide, owing to the cadmium that is still present.

This phenomenon is illustrated in FIG. 5.

The potential of the positive electrode is substantially along the curve $P_1$, $P_2$, $P_3$, $P_4$. It should be pointed out that:

The section $P_1P_2$ represents the discharge properly speaking, $P_2P_3$ represent the potential drop of the positive electrode, $P_3$ corresponds to the appearance of hydrogen, $P_3P_4$ represent the hydrogen evolvement level.

The negative electrode potential follows the curve $N_1N_2$ representing the cadmium discharge level.

The aforementioned cycle was repeated several times. In all instances, it reproduced itself with quite remarkable constancy.

During one of the following reversals carried out at 16 amperes, the accumulator was left open. The first reversal level at −0.2−0.3 volt lasted for 12 ampere hours and the second level at −1.5 volts was maintained for over 19 ampere hours. FIG. 6 shows the graph corresponding to this reversal. Along the abscissas are recorded the ampere hour values and along the ordinates the potentials of the negative and positive electrodes as well as the accumulator voltage which is equal to the algebraic difference of the potentials. It can be noted that the curve representing the potential of the negative electrode passes from the cadmium/cadmium hydroxide oxidation reduction level at about −0.8 volt to the level of oxygen evolvement around 12 ampere hours where it practically intersects the axis of the abscissas. Thus, only hydrogen was released during that first period, that is, for 12 ampere hours. During an additional 19 ampere hours, approximately, hydrogen and oxygen are evolved in combination, that is to say, up to 31 ampere hours as shown on the curves.

Since this cycle was carried out with an open accumulator, the hydrogen was thus released to the outside, and the outflow of this gas is electrochemically equivalent to a precharging of the positive electrode.

The voltage curve shown on FIG. 6 does not indicate any reversal level other than the levels corresponding to about −0.2 and −1.5 volts.

The accumulator was then recharged at 130 ampere hours, as customary.

It was then formed by being provided with a manometer and discharged, eventually, at 60 amperes, then at 16 amperes while going over to reversal. FIG. 7 illustrates the resultant pressure and voltage curves.

On the basis of the latter we obtain quite remarkable findings.

First, it should be mentioned that the abscissas always show the ampere hours and the left-hand ordinates the voltage which is at the beginning positive and thereafter becomes negative and, to the right, the pressures in kg./sq. cm.

The pressure curve begins its steady ascent only from the moment on where the terminal voltage reaches −1.5 volts, approximately. Up to this point, the pressure remains between 0 and 1 kg./sq. cm. Thereafter, the ascending slope, as shown, is extremely steep.

Another highly important observation relates to the voltage curve. One can note a first reversal level situated at about −0.2 to −0.3 volt and, thereafter, a second level situated around −0.6 to −0.8 volt. Finally, there is a third level corresponding to about −1.5 volts.

It is strange to note that no rise in pressure could be observed during the first level corresponding to −0.2 to −0.3 volt and that there was a negligible rise in pressure in the order of 1 kg./sq. cm. during the second level of −0.6 to −0.8 volt. By repeating these cycles about ten times, the presence of an auxiliary or intermediary level at about −0.7 volt was noted in all instances. The same very slight pressure was always present, that is to say, not exceeding 1 kg./sq. cm. It could even be noted that the overall length of the two first levels could be more or less long, and that thus during some cycles up to 22 ampere hours were reached although the pressure did not go beyond 1.6 kg./sq. cm.

It can thus be said that there is no doubt that, following precharge of the positive electrode (it being well understood that the negative electrode has a capacity exceeding that of the positive), by allowing a certain amount of hydrogen to escape from the accumulator during reversal, an astonishing and unexpected result had been achieved: during subsequent reversals, no further gaseous evolution occurred during the first reversal level, and a hitherto unknown reversal level had been created which did not furnish any significant overpressure. Attention was then devoted to study the extent to which it could eliminate this new auxiliary or intermediate reversal level. An excess amount of electrolyte was added to the accumulator, followed by a repetition of two charging cycles at 130 ampere hours and discharge cycles at 60 amperes up to 1 volt, the accumulator being kept open. We then followed the same procedure as in the beginning of this example after removal of the excess electrolyte and mounting of a manometer. The latter began to indicate a rise as soon as the accumulator tension had been reversed and, after 6 ampere hours of reversal at about 16 amperes, an overpressure of 10 kg./sq. cm. was achieved. No level could be noted at −0.6 to −0.8 volt.

The experiments described above thus constitute formal proof of the fact that this auxiliary or intermediate level at −0.6 to −0.8 volt, hitherto unknown, endowed the accumulator with the property of generating practically no overpressure during reversal.

It can thus be seen that, contrary to the opinion accepted to date, it is absolutely possible, by proceeding in accordance with the principle of this invention, to reverse an accumulator without noting any harmful overpressure, and to do so in the absence of any bodies specially admixed to the active materials, e.g. anti-polar masses.

I shall now make a few remarks of a theoretical nature, although they cannot exert an influence on the scope of this invention.

Since no overpressure occurs during the first level at −0.2 to −0.3 volt, it is indicated to admit that it is not hydrogen, but oxygen that is being formed and which is being resorbed at an adequate rate. This oxygen certainly continues to be formed during the second level at −0.6 to −0.8 volt. This level indicates, however, that a new transformation replaced the discharge of precharged positive active material. The recorded voltage of −0.7 volt and the oxygen evolvement potential on the negative electrode (situated at about 0.5 to 0.6 volt) furnished about −0.1 volt to the possible potential of the positive electrode. However, the potential of reduction of oxygen to the anion state of hydrogen peroxide is −0.076 volt. Accordingly, it is highly probable that the secondary reaction that consumes oxygen in cathodic compartment is the one that forms hydrogen peroxide $H_2O_2$, probably as an intermediary product.

Example II

For the tests, so-called buttontype accumulators as described in the French patent No. 1,165,706 were used. The rated capacity of the accumulators tested was 250 milli-ampere hours, corresponding to the capacity of the positive electrode, the capacity of the negative electrode being greater.

The two electrodes underwent forming separately. The electrodes had been completely discharged and the positive electrode was given two different precharge levels, namely 35 milli-ampere hours in one instance and 70 milli-ampere hours in another.

The curves summarizing these observations are shown in FIG. 8. The milli-ampere hours are entered along the abscissas and the ordinates indicate the discharge voltage values.

Reversal was carried out at 250 milli-ampere hours after the normal charging and discharging. Since this reversal rate was very high, corresponding shifts in the reversal levels could be expected.

The first curve plotted on FIG. 8 and bearing the numeral I represents an accumulator in which the positive had not received any precharge. It is, in a way, a control curve. It can be seen that, after 25 milli-ampere hours of reversal, a potential of −1.50 volts was reached.

The curve II corresponds to a precharge of 35 milli-ampere hours. It can be seen that the voltage of −1.2 volt had been reached after 35 milli-ampere hours of reversal. A level onset is clearly visible at about −0.8 volt.

The curve III corresponds to a precharge of the positive of 70 milli-ampere hours. A potential of −1.1 volts was reached after 83 milli-ampere hours of reversal which is obviously quite a remarkable result. Two levels can be clearly discerned, one at about −0.35 v. and the other one at about −0.76 volt.

This test is an additional confirmation of the observations made with regard to the preceding example. In other words, given a suitable precharge of the positive electrode it is possible to achieve a protection against the gaseous evolvements occurring during reversal, even at substantial discharge rates.

Furthermore, this example proves that it is possible to achieve a kind of quantitative determination of the anticipated protection by precharging the positive electrode to a greater or lesser extent.

Example III

As indicated above and as taught by the art, the precharge of the positive may be carried out either by charging the accumulator in the open state and allowing hydrogen to escape or by charging the positive electrode outside the accumulator, or by any other manner desired.

There exists, however, an extremely advantageous means for achieving this precharge of the positive. The procedure in question is based on the following observation. Taking completely preformed positive electrodes and non-formed or incompletely formed negative electrodes, it can be noted that they withstand reversal very well and indicate the characteristic level situated between −0.6 and −0.8 volt. This result is very certainly due to the more or less irreversible conversions occurring in the constituent active materials of the electrodes. Thus, taking, for instance, the positive electrode containing nickel hydroxide, one can note that, following precipitation of nickel hydroxide, the latter corresponds exactly to the formula $NiO.H_2O$. On forming this electrode through several charging and discharging cycles, it can be noted that its average chemical composition is $NiO_x.nH_2O$ where $x>1$. The difference $(x-1)$ is probably due to the spreading of the charged active material across the entire material so that it will prevent a complete discharge, in all probability on account of the ohmic resistance forming screens. It is found in practice that about 10 to 20% of the active material is disseminated in the charge state. A similar effect occurs in the negative electrode which, following active material impregnation, contains only $Cd(OH)_2$. Following forming, this electrode, although charged, will contain metallic cadmium in its material. The percentage of this disseminated material lies between about 10 and 20% of the total amount of cadmium.

It thus follows that during forming of the negative electrodes, the latter absorb a certain amount of hydrogen, whereas the positive electrodes absorb a certain amount of oxygen to form the material disseminated in the charge state. Accordingly, by using pre-formed positive electrodes and, e.g., non-formed or partly-formed negative electrodes, one achieves, in fact, a precharge of the positive electrode that, from the electrochemical viewpoint, is equivalent to the amount of hydrogen that will serve to reduce the disseminated part to the charged state of the negative electrode.

The invention is, of course, in no way limited to the embodiments described which were indicated by way of example only.

What is claimed is:

1. A sealed storage cell comprising a container, a sintered nickel negative electrode containing cadmium hydroxide as its active material, a sintered nickel positive electrode opposed thereto containing nickel hydroxide as its active material, said negative electrode having a greater capacity than said positive electrode, a porous separator between said electrodes, an alkaline electrolyte in said separator, said electrodes being no greater than about 1 mm. in thickness and no more than about 0.2 mm. apart, said positive electrode having at all times more electrochemically equivalent mass in the charged state than said negative electrode, whereby in the sealed cell substantially no hydrogen is developed during reversal or overcharge and the oxygen developed during reversal and overcharge is consumed and during reversal a voltage plateau is exhibited between about −.6 and −.8 volt.

2. A sealed storage cell according to claim 1 wherein said positive electrode is charged to 5 to 30% of its total capacity.

(References on following page)

References Cited by the Examiner

UNITED STATES PATENTS

| | | | |
|---|---|---|---|
| 2,642,469 | 6/53 | Gary | 136—28 |
| 2,903,496 | 9/59 | Vogt | 136—24 |
| 2,934,581 | 4/60 | Dassler | 136—9 |
| 2,951,106 | 8/60 | Ruetschi | 136—24 |
| 3,031,517 | 4/62 | Peters | 136—6 |
| 3,066,178 | 11/62 | Winkler | 136—24 |
| 3,089,913 | 5/62 | Garten et al. | 136—6 |

JOHN H. MACK, *Primary Examiner.*

JOHN R. SPECK, MURRAY TILLMAN, *Examiners.*

UNITED STATES PATENT OFFICE
CERTIFICATE OF CORRECTION

Patent No. 3,174,879                                March 23, 1965

Douchan Stanimirovitch

It is hereby certified that error appears in the above numbered patent requiring correction and that the said Letters Patent should read as corrected below.

Column 5, lines 14 to 16, in the formula, for "y=" read -- x= --; column 6, line 33, for "hydrgen" read -- hydrogen --; column 12, line 3, for "5/62" read -- 5/63 --.

Signed and sealed this 24th day of August 1965.

(SEAL)
Attest:

ERNEST W. SWIDER                                EDWARD J. BRENNER
Attesting Officer                                    Commissioner of Patents